United States Patent Office
3,661,885
Patented May 9, 1972

3,661,885
POLYURETHANE CATALYST
Roy D. Haddick, Ryhope, Karmjit Purewal, Newcastle-upon-Tyne, and Fenwick Vickers, Highfield, Rowlands Hill, England, assignors to Nuodex Limited, Birtey, England
No Drawing. Filed Apr. 22, 1968, Ser. No. 723,247
Claims priority, application Great Britain, May 1, 1967, 20,037/67
Int. Cl. C08g 22/38, 22/40
U.S. Cl. 260—97.5 AC                12 Claims

ABSTRACT OF THE DISCLOSURE

As catalysts for polyurethane production these are used, instead of stannous salts as such, complexes of stannous salts with organic complexing agents. Examples are complexes of stannous chloride or, better, stannous octanoate or the like with a ketone, lactone or amine. One advantage of using these complexes is that they have some "delayed action" effect, avoiding premature action without prejudice to their final effectiveness. They may be used in association with known tertiary amine catalysts, or with uncomplexed tin catalysts.

This invention relates to the production of polyurethanes, and in particular to certain new catalysts which are useful in the production of polyurethanes.

Polyurethanes are made by a number of processes differing in detail, but all starting from an active hydrogen-containing compound, usually a "polyol" (i.e. a di- or poly-hydroxy compound), and a di- or poly-isocyanate. The reaction normally requires the presence of a catalyst, and for this purpose there are generally used tertiary amines, such for example as triethylene diamine and N-substituted morpholines, and/or tin salts of organic acids such for example as dibutyl tin laurate and tin octanoate. Of these two tin salts, the octanoate is preferred.

According to the present invention the reaction between a polyol and a di- or poly-isocyanate to produce a polyurethane is carried out using as catalyst a pre-formed complex of a tin salt with an organic complexing agent. The invention includes both the complexes themselves and their use in the production of polyurethanes.

Complex-forming organic compounds are well known in a general sense, and include especially ketones and amines, especially secondary and tertiary amines. Suitable ketones include dialkyl ketones, e.g. methyl lower alkyl ketones such as methyl isobutyl ketone, and cyclo-aliphatic ketones, e.g. those having 5–7 ring carbons such as cyclopentanone and cyclohexanone. (By "lower alkyl" is meant an alkyl group containing 1–5 carbon atoms.) Suitable amines likewise include straight or branched chain acyclic amines as well as cyclic amines, including heterocyclic compounds in which the amino group is in the ring. Examples are triethanolamine, dimethyl amino ethanol, hexamethylene tetramine and 1,2 - dimethyl-imidazole. Lactones, especially the lactam of an ω-hydroxy fatty acid having 5–7 ring atoms, e.g. γ-butyro-lactone, can also be used. The tin salt may with advantage be stannous chloride or a salt of an organic acid, e.g. an aliphatic carboxylic acid such as stannous acetate, oxalate, octanoate or the mixture of branched aliphatic monocarboxylic acids containing 9–11 carbon atoms and marketed by Shell Chemical Company Limited as versatate. Complexes of such organic tin salts, especially the octanoate and closely related compounds, with amines have been found to be particularly useful. In certain circumstances it may be desirable to employ a mixture of complexes of one or more tin salts with two or more complexing agents, e.g. one of each general type.

The new catalyst are of value in the production of polyurethanes generally. Thus the active hydrogen-containing reactant may be a polyol of a substantially linear type, such for example as polyethylene glycol or polypropylene glycol, or of the type obtainable by condensation of one or more alkylene oxides with a di-, tri- or higher polyhydroxy compound, such as the condensation products of ethylene oxide and/or propylene oxide with a glycol, glycerol, trimethylolpropane, pentaerythritol, sucrose or sorbitol. All the above polyols are of the general class known as "polyether polyols." However, other types of polyols, such as the well known polyester polyols, can also be employed.

The di-isocyanate component of the reaction mixture will frequently be tolylene di-isocyanate (normally in the form of the commercial 80:20 mixtures of the 2.4- and 2.6-isomers), but other di- and poly-isocyanates, e.g. naphthalene-1,5-diisocyanate, 1,4-phenylene diisocyanate, 4,4′-diphenyldiisocyanate or hexamethylene diisocyanate, may also be used.

The new catalysts are valuable both in the prepolymer process and in the one-shot process for making polyurethane compositions, including foams. In the first of these a polyol, usually a polyether polyol, is reacted with excess diisocyanate to form a prepolymer having isocyanate end groups, and this is then reacted with a chain-extending or cross-linking agent, e.g. a glycol if a non-cellular product is required, or water if a foam is to be made. Foams can also be made using cross-linking agents other than water, and having present a "blowing agent," e.g. a readily volatile liquid such as the fluoro-chloro-methanes and ethanes, or by means of a gas or mechanical means, as well known in the art. In this type of process the catalyst will usually be employed in the second reaction only. In the one-shot process, as the name implies, all the components of the reaction mixture are mixed together in such a way that the polymer-forming reaction and foam formation (if required) take place in a single operation, the catalyst then being present from the beginning, usually being introduced together with one or more of the other components.

The new catalysts may be employed in similar proportions (in terms of their content of stannous tin) to those in which the known tin catalysts such as dibuyl tin laurate and tin octanoate are used, and in the same ways. For example in a one-shot process a mixture of the polyol and the catalyst may be mixed with the other components of the final reaction mixture, although if desired all the components may be brought together for the first time in the mixing head. In the prepolymer process the prepolymer may be mixed with a cross-linking agent containing the catalyst or catalysts in the actual polymer forming or foam forming operation.

It will be understood that the conventional additives, such for example as pigments and the like, or the foam stabilisers which are normally used in making polyurethane foams, may be used also in the process of the present invention. As foam stabilisers water-soluble silicone oils are usually employed. Like the previously known tin catalysts the complexes may with advantage be used together with other catalysts, in particular catalysts of the tertiary amine type referred to above.

Polyurethane objects, whether foamed or non-cellular, which have been made using the catalysts of the invention can be given a post-cure at a temperature above that at which the actual moulding and polymer formation occurs, usually at about 70°–150° C.

The complexes can be obtained by mixing the tin salt and the complexing agent in the appropriate proportions, preferably in solution. The mixing will usually be effected at about the ambient temperature; the reaction is exothermic, and the temperature may be allowed to rise, and may suitably be between 40° and 70° C. during at least the greater part of the reaction time. If desired the product may be dissolved in a plasticiser (high boiling solvent).

The new catalyst have a number of advantages. Thus ketone complexes generally, and the cyclohexanone complex in particular, are considerably more resistant to oxidation by the air than is stannous octanoate, and therefore can be handled more easily. The amine complexes have the advantage of being more or less equally active in the reaction of di- or poly-isocyanate (e.g. a prepolymer as described above) with both water (as in the production of foams) and di- and poly-hydroxy compounds such as glycols which are used in making noncellular articles. Furthermore, the complexes have a most useful delayed action effect, i.e. they operate after an induction period, which allows more time for handling the reaction mixture before polymerisation sets in, with the resulting increase in viscosity. This is particularly important with elastomers and moulding compounds. Foams obtained using the new catalysts are characterised by a very uniform cell structure, and by a better stability to light than the majority of foams previously made. Especially when an amine, e.g. a hexamethylene tetramine, complex is employed, a separate tertiary amine catalyst can normally be dispensed with if desired. Complexes with both ketones and amines are outstandingly stable in solution in polyols.

The invention is illustrated by the following examples, in which the general procedure was as follows:

Four components, namely polyol, tolylenediisocyanate, water and tin catalyst were mixed thoroughly, and the rise time of the foaming mass was noted. Agitation speed was kept constant, and the initial temperatures of the components were 25° C. Triol G. 3000 is a condensation product of propylene oxide with glycerol, of average molecular weight 3000 and hydroxyl number 58 mg. KOH/g.

EXAMPLE 1

Anhydrous stannous chloride (94 g.) was dissolved in methylated spirit (58.5 g.) and the resulting solution was filtered. A slurry of hexamethylenetetramine (140 g.) in methylated spirit (50 g.) was prepared and added to the stannous chloride solution.

The solvent was removed under vacuum leaving in the reaction vessel a white residue which was dried at 40° C. and ground to a fine powder.

93 parts of the Triol G. 3000 were mixed with 5 parts of "water catalyst" containing 3.5 parts water, 0.1 part of triethylenediamine, and 1.4 parts of a foam stabiliser, and 7.56 parts of tin catalyst comprising 7 parts of Triol G. 3000, 0.03 part dibutyltindilaurate, 0.20 part N-methyl-morpholine and 0.33 part of the complex formed from stannous chloride and hexamethylenetetramine.

45.3 parts of a mixture of 80% 2:4-tolylenediisocyanate and 20% 2:6 tolylenediisocyanate were added to the above mixture, which was stirred for fifteen seconds and then discharged into a carboard box.

The reaction mixture started to foam and rise. The expansion was completed in one minute and fifty seconds. The cardboard box with its contents was then transferred to an oven at 105° C. for curing.

This resulted in a solidified polyurethane foam having a density of 2.2 pounds per cubic foot.

EXAMPLE 2

A solution of anhydrous stannous chloride (94 g.) was prepared in methylated spirit (58.5 g.) and filtered. 98 g. cyclohexanone were weighed and added to the stannous chloride solution. The methylated spirit was removed under vacuum and the residue in the flask was washed, dried at 40° C. and powdered.

93 parts of the Triol G. 3000 were mixed with 5 parts of water catalyst comprising 3.5 parts water, 0.1 part triethylenediamine, and 1.4 parts of a silicone foam stabiliser, and 7.56 parts of tin catalyst comprising 7 parts of Triol G. 3000, 0.03 part dibutyltindilaurate, 0.20 part N-methylmorpholine and 0.33 part of the complex formed from stannous chloride and cyclohexanone.

After mixing, 45.3 parts of a mixture of an 80% 2:4-tolylenediisocyanate and 20% 2:6-tolylenediisocyante were added, and the resulting mixture was stirred and discharged into a suitable cardboard box.

After the chemical reaction had subsided, the expanded cellular mixture was transferred to an oven at 105° C. for conversion into a solidified cellular polyurethane having a density of about 2.7 pounds per cubic foot.

The rise time was found to be about two minutes.

EXAMPLE 3

(Control)

93 parts of the triol, 3.5 parts water, 0.1 part triethylenediamine, 1.4 parts of a silicone foam stabiliser, and 7.56 parts of tin catalyst containing 7 parts of the Triol G. 3000, 0.03 part of dibutyltindilurate, 0.20 part of N-methylmorpholine and 0.33 part of tin octanoate were mixed together, followed by the addition of 45.3 parts of a mixture of an 80% 2:4-tolylenediisocyanate and 20% 2:6-tolylenediisocyanate and stirring.

The reaction mixture was then discharged into a cardboard box where chemical reaction occurred. It had a rise time of one minute and fifty seconds. After the completion of expansion of the system at the ambient temperature it was transferred to an oven at 105° C. for curing to a tack-free, solidified, flexible polyurethane foam of density 2.2 pounds per cubic foot.

EXAMPLE 4

To compare the setting times using the complexes of the invention with that using a conventional agent (tin octanoate) the following experiments were carried out.

Triol G. 3000 (100 g.) was mixed with 10.9 g. of an 80:20 mixture of 2:4 and 2:6 isomers of tolylenediisocyanate. The candidate catalyst was then added to the triol-diisocyanate mixture in an amount containing 0.35 g. stannous tin. The complete mixture was blended rapidly and allowed to set at ambient temperature. The setting time was measured from the time of the addition of the catalyst under investigation.

| Catalyst: | Gelation time (minutes) |
|---|---|
| (a) Stannous octanoate | 2–3 |
| (b) Stannous chloride/hexamine complex | 20–25 |
| (c) Stannous chloride/cyclohexanone complex | 15–20 |

EXAMPLE 5

(Complex C)

Dimethylimidazole (96 g.) was added to a flask containing stannous octanoate (407 g.) and stirred under nitrogen for two hours. The reaction was exothermic, keeping the temperature of the reaction mixture in the region of 45–50° C. After two hours the product was allowed to cool under nitrogen.

The product was a pale yellow liquid of viscosity 8.8 stokes at 25° C. The total tin and the stannous tin contents were found to be 23.6% and 22.6% respectively.

EXAMPLE 6

(Complex D)

Dimethylimidazole (96 g.) was added to 480 g. of stannous versatate. The mixture was stirred under nitrogen. The temperature was maintained at 50° C. for two hours. The product was a very viscous (22.7 stokes at 25° C.) pale yellow liquid. The total tin and the stannous tin contents were 20.6% and 19% respectively.

EXAMPLE 7

(Complex E)

Dimethylaminoethanol (89 g.) was added to 407 g. of stannous octanoate and the mixture was stirred under nitrogen at 65° C. for two hours. The reaction was exothermic. The reaction product was waxy and it was dissolved in a plasticiser and filtered.

The complex was a pale straw to colourless clear liquid of viscosity 0.65 poise at 25° C. The total tin and the stannous tin contents were found to be 4.8% and 4.5% respectively.

EXAMPLE 8

(Complex F)

n-Decyldimethylamine (185 g.) was stirred under nitrogen with 407 g. of stannous octanoate. The reaction was exothermic and the temperature of the mixture was maintained at 40° C. for two hours. The product was a pale straw liquid of viscosity 4 poise at 25° C.

It had total tin and stannous tin contents of 20% and 18.5% respectively.

EXAMPLE 9

(Complex G)

n-Octyldimethylamine (157 g.) was mixed with 407 g. of stannous octanoate under nitrogen for two hours. The temperature of the reaction mixture was maintained at 45° C., and the product was a pale straw liquid having a viscosity of 4 poise at 25° C. The total tin and stannous tin contents were found to be 21% and 20% respectively.

EXAMPLE 10

The complexes formed in Examples 5–9 were evaluated as follows:

(1) The setting time.—This was the time required for complete gelation at the ambient temperature.

One hundred g. of Triol G. 3000 was weighed in a paper packet. Exactly 9.7 g. of tolylenediisocyanate was added to the triol and thoroughly mixed. The weight of complex corresponding to 0.35 g. of stannous tin was then added to the triol-isocyanate mixture and blended rapidly for ninety seconds.

The setting time was measured from the instant the catalyst was added to the triol/isocyanate mixture. It was taken as expiring when no visible flow occurred after the paper packet was inverted for one minute.

The following results were obtained.

| Catalyst: | Setting time at ambient temperatures (minutes) |
|---|---|
| Stannous octanoate (control) | 2–3 |
| Stannous salt of versatic acid (control) | 2–3 |
| Complex C | 7–9 |
| Complex D | 7–9 |
| Complex E | 3–4 |
| Complex F | 15–16 |
| Complex G | 15–16 |

(2) The Brookfield viscometer was used to illustrate the "delay action" of the complexes.

The systems catalysed with the complexes remained comparatively less viscous during the delayed action period of the complexes, and this was followed by a rapid increase in viscosity to final gelation. The initial low viscosity allows uniformity to be achieved with the systems containing the complexes.

300 g. of Triol G. 3000 was weighed in a glass jar and 29.1 g. of a mixture of 80% 2:4-tolylenediisocyanate and 20% 2:6-tolylenediisocyanate was added.

1.05 g. of the complex (in terms of stannous tin content) was then added, and the resulting mixture was blended rapidly for 45 seconds. The viscosity of the mixture was then determined 75 seconds after the end of mixing and at 30 second intervals thereafter. The results are shown in the following table:

TABLE

Brookfield viscometer readings (cps.) Spindle Number 5, speed 10 r.p.m.

| Catalysts | 2 min. | 2½ min. | 3 min. | 3½ min. | 4 min. | 4½ min. | 5 min. | 5½ min. | 6 min. | 6½ min. | 7 min. | 7½ min. | 8 min. | 8½ min. | 9½ min. | 9 min. | 10 min. | 10½ min. |
|---|---|---|---|---|---|---|---|---|---|---|---|---|---|---|---|---|---|---|
| Stannous octanoate | 3,600 | 9,000 | 23,000 | | | | | | | | | | | | | | | |
| Complex C | 800 | 1,000 | 1,200 | 1,600 | 2,200 | 2,800 | 3,200 | 5,000 | 5,800 | 10,400 | 16,600 | 23,600 | | | | | | |
| Complex D | 800 | 1,000 | 1,200 | 1,800 | 2,400 | 3,000 | 4,000 | 5,400 | 6,600 | 8,400 | 10,200 | 12,000 | 13,600 | 16,000 | 20,000 | 24,400 | | |
| Complex E | 1,000 | 1,400 | 2,400 | 2,800 | 6,000 | 9,600 | 14,800 | 22,800 | | | | | | | | | | |
| Complex F | 1,400 | 2,500 | 4,800 | 9,600 | 11,800 | 13,800 | 21,200 | | | | | | | | | | | |
| Complex G | 1,000 | 1,400 | 2,200 | 4,000 | 6,200 | 10,600 | 17,400 | 34,000 | | | | | | | | | | |

The overall rates of viscosity increase were:

| Catalyst: | Rate of increase of viscosity (cps./sec.) |
|---|---|
| Stannous octanoate | 320 |
| Complex C | 84 |
| Complex D | 72 |
| Complex E | 144 |
| Complex F | 140 |
| Complex G | 156 |

EXAMPLE 11

(Complex H)

Anhydrous stannous chloride (189.5 g.) was dissolved in methylated spirit (90 g.) and 1:2-dimethylimidazole (96 g.) was added to the solution. The reaction was exothermic. The solvent was removed under vacuum leaving in the reaction vessel a brown residue which was dried at 40° C. and ground to a fine powder.

The total tin and stannous tin contents were found to be 41.5% and 40.8% respectively.

EXAMPLE 12

(Complex I)

Example 11 was repeated, replacing the dimethylimidazole by 149 g. of triethanolamine.

The total tin and stannous tin contents of the product were 35% and 34.2% respectively.

EXAMPLE 13

(Complex J)

Example 11 was repeated, replacing the dimethylimidazole by 89 g. of dimethylaminoethanol.

The total tin and stannous tin contents of the product were found to be 42.3% and 41.8% respectively.

EXAMPLE 14

(Complex K)

To a solution of 207 g. of stannous oxalate in methylated spirit was added 96 g. of 1:2-dimethylimidazole.

The solvent was removed under vacuum, leaving a residue in the flask which was dried and ground to a fine powder having total tin and stannous tin contents of 39.3% and 37.5% respectively.

EXAMPLE 15

(Complex L)

Anhydrous stannous chloride (189.5 g.) was dissolved in methylated spirit (90 g.) and methylisobutylketone (100.2 g.) added to the solution.

The solvent was removed under vacuum and the residue recrystallised and ground to a fine powder.

The total tin and stannous tin contents were found to be 40.9% and 38.6% respectively.

EXAMPLE 16

The setting times obtained with Complexes H to L were obtained as described in Example 10, and are given below.

| Catalyst: | Setting time (minutes) |
|---|---|
| Complex H | 40 |
| Complex I | 55 |
| Complex J | 50 |
| Complex K | 60 |
| Complex L | 50 |
| Stannous octanoate (control) | 2–3 |

It will be noted that these solid complexes gave considerably longer setting times than the liquid complexes of Examples 5–9. It is found also that the liquid complexes of Examples 5–9. It is found also that the liquid complexes, besides being easier to feed uniformly in a strictly controlled amount, dissolve more quickly in the polyol, and for this reason their use will often be preferred.

The following examples, which describe the production of flexible foams, will demonstrate that it is necessary that the complex should be pre-formed, and that it is not sufficient merely to add the complexing agent to the polymer-forming mixture.

EXAMPLE 17A 93 parts of the Triol G. 3000 were mixed with 5 parts of water catalyst containing 3.5 parts of water and 1.5 parts of a foam stabilizer, and 7.36 parts of the tin catalyst comprising 7 parts of the triol, 0.03 part dibutyl tin dilaurate and 0.33 part of the Complex C.

45.3 parts of a mixture of an 80:20 mixture of 2:4 tolyenediisocyanate and 2:6-tolylenediisocyanate was added to the triol catalyst blend; the mixture obtained was stirred for fifteen seconds and then discharged into a cardboard box.

The reaction mixture began to foam and rise, and expansion was completed in one minute and fifty seconds. The box containing the foam was transferred to an oven at 105° C. for curing.

This resulted in a solidified polyurethane foam having a density of 2.4 pounds per cubic foot.

EXAMPLE 17B 93 parts of the triol were mixed with 5.06 parts of the water catalyst containing 3.5 parts water, 1.5 parts of a silicone foam stabilizer and 0.06 part of dimethylimidazole, and 7.3 parts of "tin catalyst" comprising 7 parts of triol, 0.03 part dibutyl tin dilaurate, and 0.27 part of stannous octanoate.

45.3 parts of a mixture of the tolylenediisocyanates was added to the triol catalyst blend, which was stirred thoroughly and poured into an open cardboard box.

The product did not rise to the full height. It had very low tear strength and it did not cure even after a prolonged heating period in the oven; instead it started to discolour.

EXAMPLE 18A 93 parts of Triol G. 3000, 3.5 parts of water, 1.5 parts of silicone foam stabiliser and 7.36 parts of the tin catalyst (containing 7 parts of the triol, 0.03 part dibutyl tin dilaurate and 0.33 part of Complex D) were mixed. This was followed by the addition of 45.3 parts of an 80:20 mixture of 2:4- and 2:6- tolylenediisocyanate and stirring of the resulting blend.

The reaction mixture was then poured into an open box where chemical reaction occurred. It had a rise time of two minutes. After completion of the expansion at the ambient temperature it was transferred to an oven at 105° C. for curing to a tack free, solidified, flexible foam of density 2.4 pounds per cubic foot.

EXAMPLE 18B 93 parts of Triol G. 3000, 3.5 parts water, 1.5 parts of a silicone stabiliser, 0.05 part of dimethylimidazole, and 7.31 parts of the tin catalyst (comprising 7 parts triol, 0.03 part dibutyl tin laurate and 0.28 part of stannous versatate) were mixed together with 45.3 parts of an 80:20 mixture of 2:4- and 2:6-tolylenediisocyanate.

The resulting product did not cure after even thirty minutes of heating in an oven at 105° C. It did not rise to the normal height. The sides of the half developed foam collapsed on cooling.

EXAMPLE 19A 93 parts of the triol were mixed with 5 parts of water catalyst (containing 3.5 parts water and 1.5 parts of a silicone stabiliser) and 7.36 parts of tin catalyst (containing 7 parts of the triol, 0.03 part of dibutyl tin dilaurate and 0.33 part of Complex E).

45.3 parts of the 80:20 tolylenediisocyanate mixture were added to the triol catalyst mixture which was stirred for fifteen seconds and then poured into an open box.

The reaction mixture started to rise and the expansion was completed in 2 minutes 15 seconds. The foam was transferred to the oven for curing. This gave a soft solidified, flexible foam of density 2.8 pounds per cubic foot.

EXAMPLE 19B 93 parts of the triol, 3.5 parts water, 1.5 parts of a silicone foam stabiliser, 0.06 part of dimethylaminoethanol and 7.30 parts tin catalyst (comprising 7 parts of triol, 0.03 part of dibutyl tin dilaurate and 0.27 parts of stannous octanoate) were mixed together. This was followed by the addition of the 80:20 mixture of 2:4- and 2:6-tolylenediisocyanates and stirring of the resultant mass.

It was then poured into a box and cured in an oven at 105° C. The foam reached its full height in five minutes at the room temperature. It had a large percentage of closed cells. It shrank on cooling.

EXAMPLE 20A 93 parts of the Triol G. 3000 were mixed with 3.5 parts of water, 1.5 parts of a silicone foam stabiliser and 7.36 parts of tin catalyst (comprising 7 parts of triol, 0.03 part of dibutyl tin dilaurate and 0.33 part of the Complex F).

45.3 parts of the 80:20 tolylenediisocyanate mixture was then stirred with the triol catalyst mixture for fifteen seconds and the reaction mixture poured into a cardboard box.

The mixture began to foam and rise. The rise time was found to be 2 minutes and 15 seconds. The foam had a density of 3 pounds per cubic foot.

EXAMPLE 20B 93 parts of Triol G. 3000 were mixed with 3.5 parts water, 1.5 parts of a silicone stabiliser, 0.1 part of n-decyl dimethylamine, and 7.26 parts of the tin catalyst (comprising 7 parts of the triol, 0.23 part of stannous octanoate and 0.03 part dibutyl tin dilaurate).

45.3 parts of the 2:4- and 2:6-tolylenediisocyanate mixture was blended thoroughly with the triol activator mixture. It was then transferred to the box and allowed to foam.

The foam rose very slowly in 5 minutes to about half the height of the foams obtained in Examples 17A, 18A, 19A and 20A.

EXAMPLE 21A 93 parts of Triol G. 3000 were mixed with 3.5 parts of water, 1.5 parts of a foam stabiliser and 7.36 parts of the tin catalyst (containing 7 parts triol, 0.03 part of dibutyl tin dilaurate and 0.33 part of the Complex G).

45.3 parts of the 80:20 tolylenediisocyanate mixture was added and blended rapidly with the triol containing the catalyst.

The resulting mixture was quickly poured into an open cardboard box and allowed to foam and rise.

The foam reached its complete height in 2 minutes and 15 seconds. It was then cured in an oven at 105° C. to a density of 3.3 pounds per cubic foot.

EXAMPLE 21B 93 parts of the triol were mixed with 3.5 parts water, 1.5 parts of a silicone stabiliser, 0.09 part of n-octyldimethylamine and 7.27 parts of the tin catalyst (containing 7 parts of triol, 0.03 part of dibutyl tin dilaurate and 0.24 part of stannous octanoate).

45.3 parts of tolylenediisocyanate was then thoroughly mixed with the triol catalyst blend. The resulting mixture was poured into an open box. The mass began to rise very slowly. It rose to about half the height of that obtained in Example 21A in 6 minutes.

It was placed in an oven for curing at 105° C. The final product had very much lower tear strength than the foam obtained in Example 21A.

EXAMPLE 22

(Control)

93 parts of the triol, 3.5 parts water, 0.1 part triethylenediamine, 1.5 parts of a silicone foam stabiliser and 7.53 parts of tin catalyst (comprising 7 parts triol, 0.03 part dibutyl tin dilaurate, 0.20 part of n-methyl morpholine and 0.33 part of stannous octanoate) were mixed together. This was followed by the addition of 45.3 parts of the tolylenediisocyanate mixture and stirring.

The reaction mixture was then discharged into an open cardboard box where chemical reaction occurred. It had a rise time of one minute and fifty seconds. After the completion of the expansion at the ambient temperature it was transferred to an oven at 105° C. for curing to a tack free, solidified flexible foam having a density of 2.2 pounds per cubic foot.

Table II shows the typical physical properties of the flexible polyurethane foams made according to Examples 17–21 using the complexes.

Tensile strength is the stress required to stretch a test piece, at a uniform rate, to its breaking point. The elongation at break gives a measure of elasticity, while the compression set indicates the deflection of the original foam height after it has been subjected to a specified degree of compression by a load.

TABLE II.—PHYSICAL PROPERTIES OF THE FLEXIBLE FOAMS

| Catalyst | Density (lb./cu. ft.) | Tensile strength (p.s.i.) | Elongation at break (percent) | Compression set at 75 (percent) |
|---|---|---|---|---|
| Stannous octanoate (control) | 2.4 | 18.1 | 260 | 3.1 |
| Complex C | 2.2 | 18.4 | 270 | 4.2 |
| Complex E | 2.8 | 18.0 | 250 | 2.8 |
| Complex F | 3.0 | 17.0 | 230 | 3.8 |
| Complex G | 3.3 | 18.0 | 255 | 3.0 |

The compound referred to above as stannous octanoate is more accurately described as stannous 2-ethylhexanoate.

We claim:

1. In catalyst compositions for polyurethane production comprising stannous chloride, the improvement consisting essentially of employing the stannous chloride in a form consisting essentially of a preformed complex with a tertiary amine complexing agent selected from the group consisting of tri-ethanolamine, N-methyl-ethanolamines, hexamethylenetetramine, 1,2-dimethylimidazole, N-alkyldimethylamines and N-methylmorpholine, the said preformed complex being obtained by forming a solution of said stannous chloride and complexing agent in an organic solvent, and maintaining said solution at a temperature of from 40° to 70° C. for a time sufficient to form a solution of complexed stannous chloride substantially free from uncomplexed stannous chloride.

2. Catalyst compositions according to claim 1, in which the complex is in solution in a plasticiser.

3. In a process for the production of polyurethane by reaction between an organic polyol and an organic polyisocyanate in the presence of a catalyst of stannous chloride the improvement consisting of employing the stannous chloride in the form consisting essentially of the preformed complex claimed in claim 1.

4. Process according to claim 3, in which the polyurethane is made by the pre-polymer method, and the complex is added with the reactant added to the prepolymer.

5. Process according to claim 3, in which the polyurethane is made by the one shot process, and the complex is present from the beginning of the reaction.

6. Process according to claim 3, in which the complex is added to at least one of the polyol and organic polyisocyanate as a solution in a plasticiser.

7. In catalyst compositions for polyurethane production comprising a stannous carboxylate salt selected from the group consisting of stannous acetate, oxalate, octanoate and versatate, the improvement consisting essentially of employing the stannous salt in a form consisting essentially of a preformed complex with a tertiary amine complexing agent selected from the group consisting of triethanolamine, N-methyl-ethanolamines, hexamethylenetetramine, 1,2-dimethylimidazole, N-alkyldimethylamines and N-methylmorpholine, the said preformed complex being obtained by a liquid phase solution of said complexing agent and said stannous carboxylate salt and maintaining said liquid phase solution at a temperature of from 40° to 80° C. for a time sufficient to form a complexed stannous salt substantially free of uncomplexed stannous salt.

8. In a process for the production of polyurethane by reaction between an organic polyol and an organic polyisocyanate in the presence of a catalyst of a stannous carboxylate salt selected from the group consisting of stannous acetate, oxalate, octanoate and versatate, the improvement consisting essentially of employing the stannous carboxylate salt in the form consisting essentially of the preformed stannous carboxylate salt complex claimed in claim 7.

9. Catalyst compositions according to claim 7 in which the complex is in solution in a plasticiser.

10. Process according to claim 8 in which the polyurethane is made by the pre-polymer method and the complex is added with the reactant added to the prepolymer.

11. Process according to claim 8 in which the polyurethane is made by the one-shot process and the complex is present from the beginnings of the reaction.

12. Process according to claim 8 in which the complex is added to at least one of the polyol and organic polyisocyanate as a solution in a plasticiser.

(References on following page)

References Cited

UNITED STATES PATENTS

| | | | |
|---|---|---|---|
| 3,036,022 | 5/1962 | Stewart et al. | 260—2.5 |
| 3,055,845 | 9/1962 | Merten et al. | 260—2.5 |
| 3,073,802 | 1/1963 | Windemuth et al. | 260—77.5 |
| 3,164,557 | 1/1965 | Merten et al. | 260—2.5 |
| 3,177,223 | 4/1965 | Erner | 260—309 |
| 3,450,648 | 6/1969 | Windemuth | 260—77.5 X |
| 3,152,094 | 10/1964 | Erner | 260—77.5 X |
| 3,044,971 | 7/1962 | Polis | 260—77.5 X |

FOREIGN PATENTS

| | | | |
|---|---|---|---|
| 936,395 | 9/1963 | Great Britain | 260—2.5 |
| 1,003,201 | 9/1965 | Great Britain | 260—2.5 |

OTHER REFERENCES

M&T Technical Data Sheet No. 181, "M&T Catalyst T-18," revised January 1962, copyright 1965.

MAURICE J. WELSH, Primary Examiner

C. W. IVY, Assistant Examiner

U.S. Cl. X.R.

252—426, 429, 431 C; 260—2.5 AB, 2.5 AC, 75 NB, 75 NC, 77.5 AB, 429.7